United States Patent [19]

Seyler

[11] Patent Number: 4,529,179
[45] Date of Patent: Jul. 16, 1985

[54] INTERNAL NUT FOR ADJUSTING THE TENSION OF A COIL SPRING

[75] Inventor: Peter G. Seyler, Franklin Park, Ill.

[73] Assignee: Perfection Spring & Stamping Corp., Mt. Prospect, Ill.

[21] Appl. No.: 518,199

[22] Filed: Jul. 28, 1983

[51] Int. Cl.³ .............................................. F16F 1/04
[52] U.S. Cl. ..................................... 267/60; 267/177
[58] Field of Search .................... 267/60, 61 R, 61 S, 267/73–74, 70–71, 170–179, 166, 169, 120, 180

[56] References Cited

U.S. PATENT DOCUMENTS

| | | | |
|---|---|---|---|
| 273,695 | 3/1883 | Knobeloch | 267/170 |
| 836,811 | 11/1906 | Kennebrew | 267/166 |
| 965,838 | 7/1910 | Sanborn, Jr. | 267/73 |
| 973,641 | 10/1910 | Dysart | 267/166 |
| 1,348,522 | 8/1920 | Sweiven | 267/167 |
| 2,996,295 | 8/1961 | Smith | 267/178 |
| 3,041,060 | 6/1962 | Jacobsen | 267/177 |
| 3,326,545 | 6/1967 | Bache et al. | 267/61 R |
| 3,494,613 | 2/1970 | Hatfield | 267/178 X |

Primary Examiner—Douglas C. Butler
Attorney, Agent, or Firm—Tilton, Fallon, Lungmus

[57] ABSTRACT

A nut for adjusting the tension of a coil spring is formed from a flat strip of material. The strip is notched to form a disc having a generally circular rim with at least one notch in the rim, and the rim is formed to provide a portion of one turn of a helical screw thread which extends around the periphery of the disc from one side of the notch to the other side of the notch. The center of the disc can be extruded and tapped. The nut is screwed into a coil spring by inserting the helical rim of the nut between the first and second coils of the coil spring and rotating the nut with respect to the spring.

14 Claims, 10 Drawing Figures

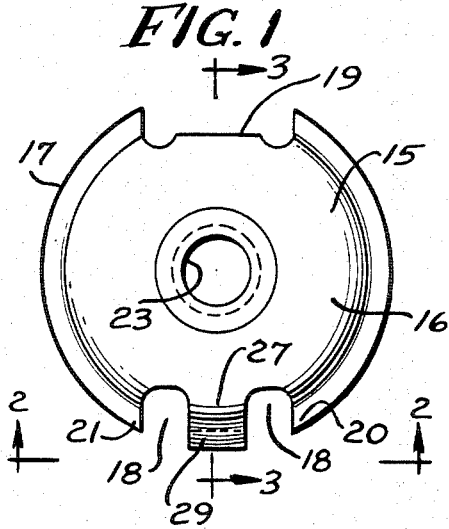
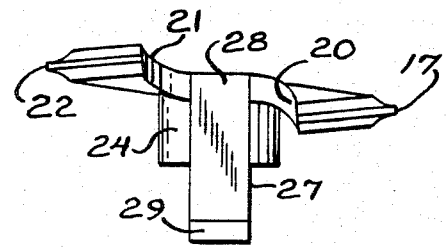
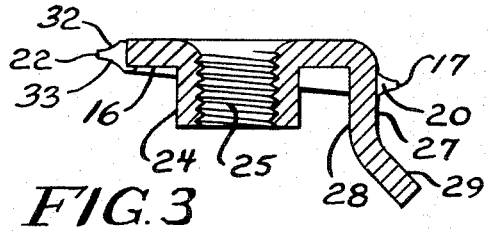
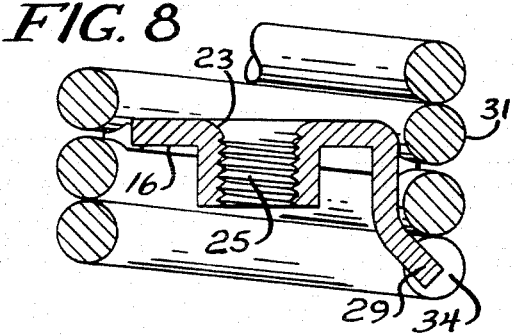
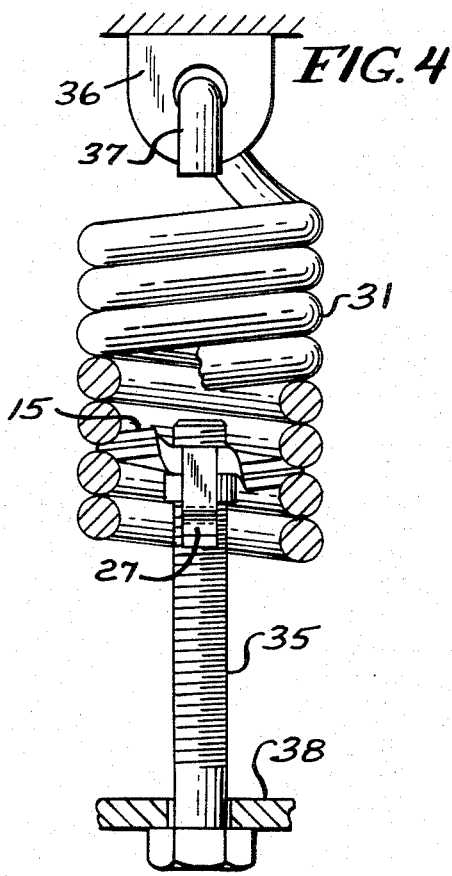
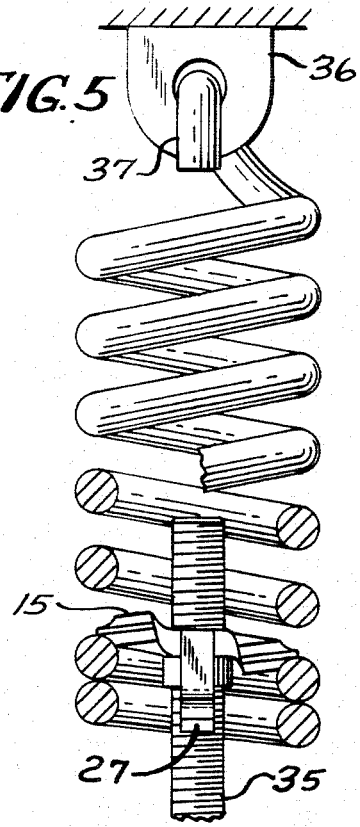

INTERNAL NUT FOR ADJUSTING THE TENSION OF A COIL SPRING

BACKGROUND AND SUMMARY

This invention relates to an external threaded nut for adjusting the tension of a coil spring, and, more particularly, to a nut which can be formed from a flat strip of material.

The manufacturing of springs is a well-established science. However, because of a multitude of variables, such as tensile strength of the spring material, tolerances of wire size, etc., commercial tolerances for spring loads are generally rather substantial, e.g., of the order of ±10%. The tolerances of the spring plus the tolerances of the components which are attached to the spring make it desirable at times to have some adjusting means for compensating for these variables. Adjusting means are also desirable for enabling a particular spring in a particular application to be used with different loads or to vary the spring rate.

It is known to use externally threaded nuts for adjusting the tension of a coil spring. The nut is screwed into one end of the spring so that the spring force is determined by the distance between the nut and the other end of the spring. However, externally threaded nuts in which the threads are cut by screw machinery can be relatively expensive for certain applications.

Automobile trunk lids have been equipped with gas springs to provide a raising force which assists in opening the trunk lid. Gas springs have not been entirely satisfactory, and a coil spring system has been considered by at least one automobile manufacturer. A spring is used because of weight variation of different trunk lids, and the spring tension must be adjustable without substantially increasing the cost of the spring system.

The invention provides an internal adjusting nut for a coil spring which can be manufactured economically and accurately from a flat strip of material by simple stamping and forming operations. The strip is notched to form a disc having a generally circular rim with at least one notch in the periphery of the rim. The rim is formed into a helical shape to provide a portion of one turn of a screw thread which extends around the periphery of the rim from one side of the notch to the other side of the notch. If desired, the center of the disc can be extruded and tapped to receive a threaded rod or bolt. The nut is screwed into a coil spring by inserting the helical rim of the nut between the first and second coil of the spring and rotating the nut with respect to the spring for at least one more turn.

DESCRIPTION OF THE DRAWING

The invention will be explained in conjunction with an illustrative embodiment shown in the accompanying drawing, in which:

FIG. 1 is a top plan view of an internal nut formed in accordance with the invention;

FIG. 2 is a side elvational view of the nut taken along the line 2—2 of FIG. 1;

FIG. 3 is a sectional view taken along the line 3—3 of FIG. 1;

FIG. 4 is an illustration, partially broken away, of the nut screwed into a coil spring;

FIG. 5 is a view similar to FIG. 4 showing the spring under tension;

FIG. 8 is a sectional view of the nut similar to FIG. 3 showing the stop member engageable with the end of the spring;

DESCRIPTION OF SPECIFIC EMBODIMENT

Figure 6:
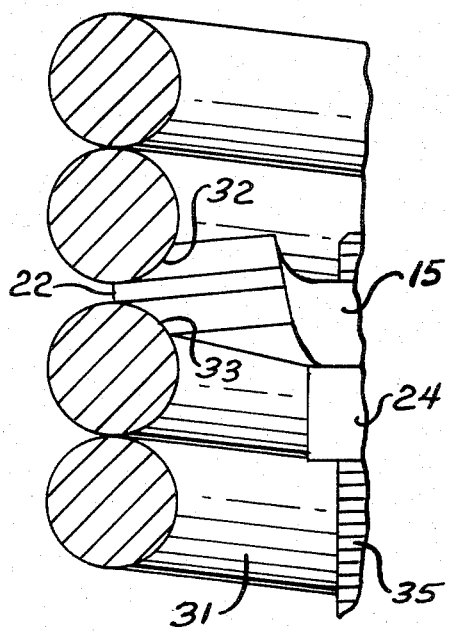
FIG. 6 is an enlarged fragmentary view of a portion of FIG. 4.
Figure 7:
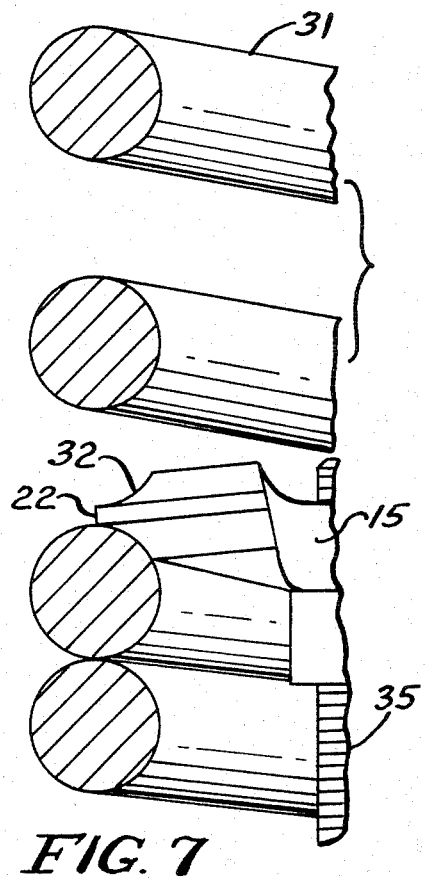
FIG. 7 is an enlarged fragmentary view of a portion of FIG. 5.

Referring to FIGS. 1-3, an internal nut 15 includes a central, generally flat disc portion 16 and a circular rim 17. The rim has a pair of diametrically opposed notches 18 and 19 formed in it, and the rim is deformed from the plane of the central disc portion to form a portion of one turn of a helix or a screw thread. The lowermost portion 20 of the screw thread is at the right side of the notch 18 in FIGS. 1 and 2, and the rim extends helically upwardly to the uppermost portion 21 at the left side of the notch 18. The notch 19 interrupts the helix on the other side of the nut. The crest of the thread is equal and uniform around the circumference of the nut, except where interrupted by the notches. The upper and lower surfaces of the rim 17 are tapered or coined to provide a relatively sharp edge 22.

The center of the disc portion 16 is pierced and extruded to form a central opening 23 and a cylinder 24 which extends generally perpendicularly to the plane of the disc. The extruded cylinder is tapped to provide internal screw threads 25.

A stop tab 27 extends generally perpendicularly from the disc portion 16 within the notch 18. The stop tab includes a first portion 28 which extends perpendicularly to the disc portion and parallel to the axis of the extrusion 23, and an end portion 29 which flares outwardly away from the axis of the extrusion.

FIG. 4 illustrates the internal nut 15 screwed into a coil spring 31. The sharp edge 22 of the helical rim of the nut can readily be forced between the end of the first turn or coil of the spring and the next coil, and the nut can be screwed into the spring by rotating the nut with respect to the spring. The helical rim of the nut has the same pitch as the helix of the coil spring before the spring is tensioned.

In the embodiment illustrated, the coined edge 22 of the helical rim is provided by two radiused portions 32 and 33 (FIG. 3) on the upper and lower surfaces of the rim. The radii of the radiused portions 32 and 33 are substantially the same as the radius of the wire of the coil spring 31. The radiused portions facilitate the insertion of the nut into the spring, increase the bearing area between the nut and the spring and the friction therebetween, and increase the holding strength of the nut against the spring when a tensioning force is exerted on the nut.

The nut should be screwed into the coil spring so that at least two coils of the spring are below the nut as shown in FIG. 4. When a tension force is exerted on the nut, as shown in FIG. 5, the first coil of the spring supports the second coil, which is in contact with the bottom of the nut.

The flared end 29 of the stop tab 27 is designed to stop against the end 34 of the spring (FIG. 8) and acts as a positioning means when the nut has been inserted for the desired distance. The stop tab can be omitted if it is not necessary to insert the nut to a certain position.

Still referring to FIG. 4, a threaded draw bar or bolt 35 is screwed into the threaded central opening of the nut. One end of the coil spring is connected to a member 36 by a hook 37 on the end of the spring, and the draw bar is connected to another member 38. The members 36 and 38 can be any two parts on which it is desired to exert a spring force either when the parts are stationary or when the parts separate. One specific use of the internal nut 15 has been in a spring assembly for raising an automobile trunk lid. The member 38 to which the draw bar was attached was a stationary part of the trunk frame, and the member 36 to which the hooked end 37 of the spring was attached was the counterbalance mechanism of the trunk lid. The spring was under tension when the trunk lid was closed, and when the trunk lid was unlocked, the spring force acting on the counterbalance mechanism assisted in raising the trunk lid.

The spring can be tensioned from its FIG. 4 position merely by rotating the bolt until the spring is tensioned as desired as illustrated in FIG. 5. The frictional force between the nut and the coils of the spring prevent rotation of the nut as the bolt turns, and rotation of the nut in a clockwise direction is further prevented by the stop tab 27. Alternatively, the spring can be tensioned by pulling the draw bar 35 until it can be attached to the part 38, as by inserting the head end of the draw bar in a slot in part 38 or by equipping the draw bar with a hooked end.

The tension of the spring can also be adjusted by screwing the nut into the spring in order to reduce the effective length of the spring. Only the spring coils between the nut and the hooked end 37 of the spring are tensioned when a pulling force is exerted on the spring. The stop tab 27 can be omitted if it is desired to advance the nut farther into the spring. After initial adjustment of the nut and the draw bar relative to the spring, further adjustment of either the nut or the draw bar can be made after a period of use in order to compensate for wear, fatigue, etc. of the assembly.

The crest of the thread of the nut is equal and uniform around the entire circumference of the nut except for the notches 18 and 19. The nut is thereby maintained in a stable position relative to the spring, and the axis of the threaded opening 23 in the nut is maintained in alignment with the axis of the spring as the nut is screwed into the spring and as the spring is tensioned. The draw bar 35 is thereby also maintained in alignment with the axis of the spring. The alignment of the nut and the draw bar with the axis of the spring minimizes stresses on the nut and the draw bar.

The notch 18 is necessary because of the helix of the thread of the nut so that the beginning and end of the thread can be separated along the axis of the helix. The notch 19 is provided mainly as part of the forming operation of the nut as will as described hereinafter, and the notch 19 can be omitted if desired so that the helical rim of the nut extends continuously from one side of the notch 18 to the other side of the notch 18.

The preferred embodiment of the nut is provided with the cylindrical extrusion 24 in order to form the threaded central portion. However, other means can be provided for attaching the nut to the tensioning member. For example, a straight pierced hole can be formed in the nut to receive a clinch nut or a cold headed draw bar.

The nut can be made by a variety of different procedures, such as stamping, cold heading, die casting, powdered metal, etc., depending upon the load or tension required. The nut can also be molded from plastic if the load is not large.

Figures 9, 10:
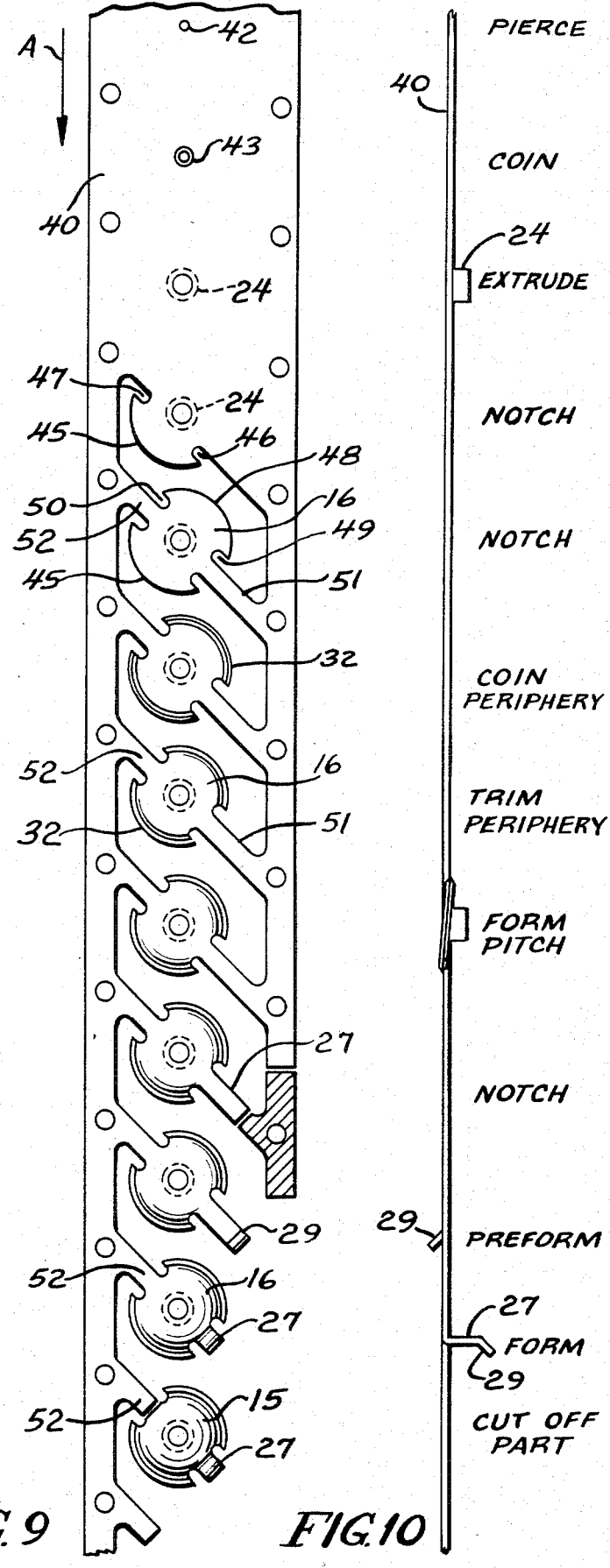
FIG. 9 is a top plane view showing the stamping and forming operations on a strip of material for forming a nut.
FIG. 10 is a side elevational view of the strip showing selective operations.

The preferred method of forming the nut is stamping and forming from a flat strip of material. Referring to FIGS. 9 and 10, a flat strip 40 of metal is advanced in the direction of the arrow A through a series of stamping and forming stations in a conventional metal stamping machine which is provided with suitable dies. At the first station the strip is pierced to form a hole 42. At the second station the hole is coined as at 43. At the third station the strip is extruded at the opening to form the cylindrical extrusion 24. Depending upon the thickness and depth of the extrusion, more than one station for this operation may be necessary.

At the next station a portion of the strip is notched or stamped to form a semicircular edge 45 which terminates at two notches 46 and 47. At the next station another portion of the strip is notched or stamped to form a semicircular edge 48 which terminates at two notches 49 and 50. The semicircular edges 45 and 48 surround the central disc portion 16, and the disc is supported by two connecting strips 51 and 52 which are attached to the remainder of the strip 40.

At the station marked "Coin Periphery" in FIG. 10, the semicircular edges 45 and 48 are coined to provide the radiused portions 32 and 33, and the outer edges are trimmed at the next station.

In the station marked "Form Pitch" in FIG. 10, the rim of the disc is formed into a helical shape to provide the screw thread.

At the next station the connecting strip 51 is notched or severed from the carrier strip 40 to provide the stop tab 27. Thereafter the flared end 29 of the stop tab is formed at the station designated "Preform", and the stop tab is formed to extend perpendicularly to the plane of the disc. Finally, the connecting strip 52 is separated from the disc 16 to cut-off the part from the carrier strip and to form the completed nut 15.

The connecting strips 51 and 52 maintain the squareness and perpendicularly of the part during the coining and forming operations.

In one specific embodiment of the nut, the outside diameter was 29.2 mm., the length of the notches 18 and 19 was 12.5 mm., and the pitch of the helical thread was 5.74. The nut was formed from 2.25 to 2.69 gauge steel, and the radiused portions 32 and 33 each had a radius of 2.6 mm.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. A nut adapted to be screwed into a selected position along the inside of a coil spring for setting the spring's effective operating length and thereby controlling the tensioning force of that spring, said nut being integrally formed from flat sheet material and comprising a planar central disc portion and an outer rim portion of substantially the same thickness as said central disc portion, said outer rim portion having opposite side surfaces merging with the adjacent side surfaces of said central disc portion to provide a smooth transition between said surfaces of the respective portions and having notch means extending inwardly from the periphery thereof, said outer rim portion being deformed from the plane of said central disc portion so that its periphery defines the major extent of one turn of a helical screw thread beginning and ending at said notch means, said opposite side surfaces of said outer rim portion adjacent said notch means curving gradually away from the adjacent side surfaces of said central disc portion, and said central disc portion having an opening extending axially therethrough.

2. The nut of claim 1 in which said outer rim portion is provided with second notch means diametrically opposed to the first-mentioned notch means, said second notch means interrupting the helical screw thread defined by said periphery of said outer rim portion.

3. The nut of claim 1 including a stop member extending from said central disc portion at said notch means, said stop member including a first portion extending generally parallel to the axis of said central disc portion and an end portion extending outwardly away from the axis of said central disc portion.

4. The nut of claim 1 in which said central disc portion is provided with a screw thread within said axial opening.

5. The nut of claim 1 in which said outer rim portion terminates in a tapered edge of substantially uniform radial cross section adapted for insertion between adjacent turns of a tension coil spring.

6. The nut of claim 5 in which said tapered edge is provided with upper and lower radiused surfaces which are engageable with adjacent coils of the tension coil spring.

7. In combination, a helical tension spring having multiple coils positioned closely together when said spring is in an unstretched state, and a nut located in a selected position of adjustment within said spring for setting the tensioning forces of such spring, said nut being integrally formed from flat sheet material and comprising a planar central disc portion and an outer rim portion of substantially the same thickness as said central disc portion, said outer rim portion having opposite side surfaces merging with the adjacent side surfaces of said central disc portion to provide a smooth transition between said surfaces of the respective portions and having notch means extending inwardly from the periphery thereof, said outer rim portion being deformed from the plane of said central disc portion so that its periphery defines the major extent of one turn of a helical screw thread beginning and ending at said notch means, said opposite side surfaces of said outer rim portion adjacent said notch means curving gradually away from the adjacent side surfaces of said central disc portion, said screw thread of said nut having the same pitch as the coils of said spring in an unstretched state and being positioned between adjacent coils of said spring, and means provided by said nut for centrally connecting the same to a draw bar.

8. The combination of claim 7 in which said outer rim portion of said nut is provided with second notch means diametrically opposed to the first-mentioned notch means, said second notch means interrupting the helical screw thread defined by said periphery of said outer rim portion.

9. The combination of claim 7 in which said nut includes a stop member extending from said central disc portion at said notch means, said stop member contacting said coil spring for limiting the extent to which said nut is screwed into said spring.

10. The combination of claim 9 in which said stop member comprises a tab extending from said central disc portion at said notch, said tab including a first portion extending generally parallel to the axis of said central disc portion and an end portion extending outwardly away from the axis of said central disc portion.

11. The combination of claim 7 in which said means for centrally connecting said nut to a draw bar comprises an internally threaded axial opening through said central disc portion of said nut, said threaded axial opening being adapted for threadedly receiving the end of a draw bar.

12. The combination of claim 11 in which said combination includes a draw bar having a threaded portion screwed into and extending through said axial opening of said nut.

13. The combination of claim 7 in which said outer rim portion of said nut terminates in a peripheral edge having upper and lower radiused surfaces each having a radius substantially the same as the radius of the wire of said coil spring, said radiused surfaces engaging adjacent coils of said spring.

14. The combination of claim 7 in which said screw thread of said nut is positioned between adjacent coils of said spring at a location at least two coils from the end of said spring closest to said nut.

* * * * *